United States Patent
Zhang

(10) Patent No.: US 11,996,689 B2
(45) Date of Patent: May 28, 2024

(54) BRIDGE SUPPLY CIRCUIT OF MULTIPATH EFUSE CHIP AND SERVER

(71) Applicant: INSPUR SUZHOU INTELLIGENT TECHNOLOGY CO., LTD., Jiangsu (CN)

(72) Inventor: Songtao Zhang, Shandong (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/246,127

(22) PCT Filed: Sep. 29, 2021

(86) PCT No.: PCT/CN2021/121882
§ 371 (c)(1),
(2) Date: Mar. 21, 2023

(87) PCT Pub. No.: WO2022/127292
PCT Pub. Date: Jun. 23, 2022

(65) Prior Publication Data
US 2023/0361556 A1    Nov. 9, 2023

(30) Foreign Application Priority Data
Dec. 18, 2020 (CN) .......................... 202011506184.0

(51) Int. Cl.
*H02H 7/20* (2006.01)
*G06T 1/20* (2006.01)

(52) U.S. Cl.
CPC ................ *H02H 7/20* (2013.01); *G06T 1/20* (2013.01)

(58) Field of Classification Search
CPC ............ H02H 7/20; G06T 1/20; G09G 5/363
(Continued)

(56) References Cited

U.S. PATENT DOCUMENTS 6,720,820 B1    4/2004  Chuang et al.
2009/0058503 A1 3/2009  Genden et al.

FOREIGN PATENT DOCUMENTS

CN    110825205 A    2/2020
CN    111338453 A    6/2020
(Continued)

OTHER PUBLICATIONS

International search report for PCT/CN2021/121882 dated Dec. 30, 2021.
(Continued)

*Primary Examiner* — Jacinta M Crawford
(74) *Attorney, Agent, or Firm* — Dennemeyer & Associates LLC; Victoria Friedman

(57) ABSTRACT

The present application provides a bridge supply circuit of a multipath Efuse chip and a server. The supply circuit includes: a first Efuse chip and multiple second Efuse chips, inputs of the first Efuse chip and the multiple second Efuse chips being connected to a power supply, an output of the first Efuse chip being connected to each of the Graphics processing units (GPUs), an output of each of the multiple second Efuse chips being separately connected to each of the GPUs except for a first GPU; damping circuits, each of the damping circuits being separately provided between the output of each of the multiple second Efuse chips and the GPU; and current paths, each of the current paths being separately provided between the output of the first Efuse chip and each of the GPUs except for the first GPU.

20 Claims, 1 Drawing Sheet

(58) Field of Classification Search
USPC .......................................................... 345/502
See application file for complete search history.

(56) References Cited

FOREIGN PATENT DOCUMENTS

| CN | 112000190 A | 11/2020 |
| CN | 112068687 A | 12/2020 |
| CN | 112631410 A | 4/2021 |

OTHER PUBLICATIONS

Chinese search report for application No. 202011506184.0, filed Dec. 18, 2020.
Semiconductor Components Industries, LLC., "AND9623/D Paralleling eFuses", On Semiconductor Application Note www.onsemi.com, Aug. 31, 2017 (Aug. 31, 2017), 1-10 pp. 1-9.

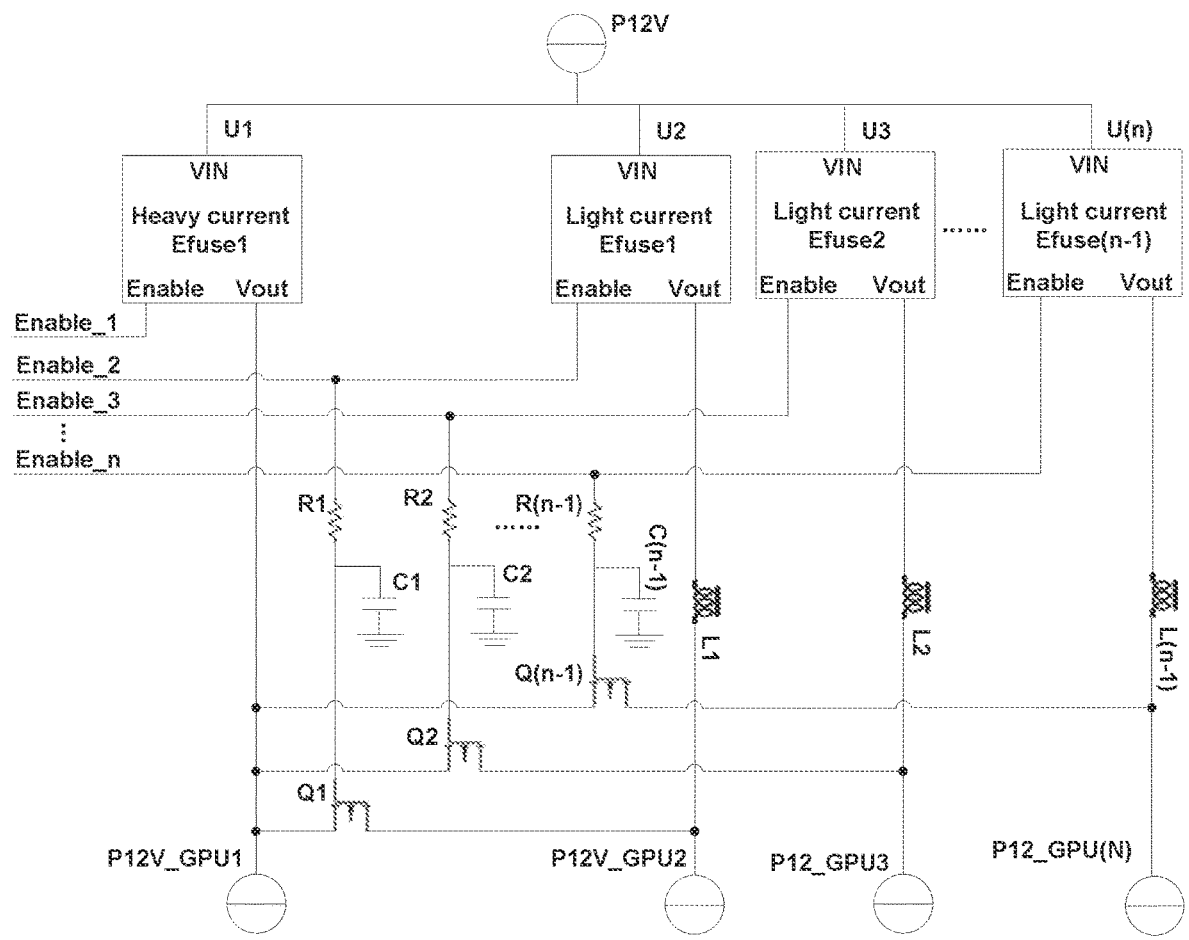

US 11,996,689 B2

BRIDGE SUPPLY CIRCUIT OF MULTIPATH EFUSE CHIP AND SERVER

CROSS-REFERENCE TO RELATED APPLICATIONS

This is a 35 U.S.C. 371 National Stage Patent Application of International Application No. PCT/CN2021/121882, filed Sep. 29, 2021, which claims priority to Chinese application 202011506184.0, filed Dec. 18, 2020, each of which is hereby incorporated by reference in its entirety.

TECHNICAL FIELD

The present application relates to the field of computers, and more particularly, to a bridge supply circuit of a multipath Efuse chip and a server.

BACKGROUND

The current of a related Graphics processing unit (GPU) card has two critical values: a Thermal Design Current (TDC) that is the maximum working continuous current of the GPU; and a maximum current Imax that is the maximum current within a short time when the GPU works, typically several milliseconds in duration. The maximum current may be 2-3 times or even more than 3 times of the TDC.

Therefore, when selecting an Efuse chip to control a single GPU, the maximum current, rather than the TDC, should be taken into account. Taking a T4GPU of 75 W as an example, the TDC at the working voltage of 12 V is 5.5 A, the maximum working current I_MAX of partial GPUs will reach 18 A, and the duration of the maximum current will be only 200-300 microseconds.

However, the current of the selected Efuse chip (electronic fuse) must be more than 20 A, preferably about 25 A to meet the design requirement. An Efuse chip of 10 A maynot be selected, even partial Efuse chips of 15 A maynot meet the design requirement. However, the actual working continuous current is only 5.5 A, which causes a great waste to the use of the Efuse chips, thereby increasing the design cost.

SUMMARY

In view of this, embodiments of the present application aim to propose a bridge supply circuit of a multipath Efuse chip and a server.

Based on the above object, according to an aspect of the embodiments of the present application, a bridge supply circuit of a multipath Efuse chip is provided, which may include:
a first Efuse chip and multiple second Efuse chips, inputs of the first Efuse chip and the multiple second Efuse chips being connected to a power supply, an output of the first Efuse chip being connected to each of Graphics processing units (GPUs), an output of each of the multiple second Efuse chips being separately connected to each of the GPUs except for a first GPU;
damping circuits, each of the damping circuits being separately provided between the output of each of the multiple second Efuse chips and the GPU; and
current paths, each of the current paths being separately provided between the output of the first Efuse chip and each of the GPUs except for the first GPU.

According to one embodiment of the present application, a maximum current of the first Efuse chip is configured to be greater than $I_{MAX}+(n-1)*(I_{MAX}-I_{TDC})$, and $I_{MAX}$ is a maximum current of the GPU, $I_{TDC}$ is a maximum working continuous current of the GPU, and n is a number of the GPUs.

According to one embodiment of the present application, a maximum current of each of the multiple second Efuse chips is configured to be greater than a maximum working continuous current of the GPU and less than a maximum current of the GPU.

According to one embodiment of the present application, the damping circuit is composed of at least one inductor, a current of the inductor is configured to be greater than a maximum working continuous current of the GPU.

According to one embodiment of the present application, the current path is composed of at least one Metal Oxide Semiconductor (MOS) transistor, a source of the MOS transistor is connected to the output of the first Efuse chip, a drain of the MOS transistor is connected to an output of the damping circuit, and a gate of the MOS transistor is connected to an enable terminal of the second Efuse chip.

According to one embodiment of the present application, the bridge supply circuit may further include:
a delay circuit, the delay circuit being provided between the gate of the MOS transistor and the enable terminal of the second Efuse chip, and the delay circuit being composed of at least one resistor and at least one capacitor.

According to one embodiment of the present application, a maximum working current of the MOS transistor is configured to be greater than a difference between a maximum current of the GPU and a maximum working continuous current of the GPU.

According to another aspect of the embodiments of the present application, a server is also provided. The server may include a bridge supply circuit of a multipath Efuse chip, the bridge supply circuit of the multipath Efuse chip includes:
a first Efuse chip and multiple second Efuse chips, inputs of the first Efuse chip and the multiple second Efuse chips being connected to a power supply, an output of the first Efuse chip being connected to each of Graphics processing units (GPUs), an output of each of the multiple second Efuse chips being separately connected to each of the GPUs except for a first GPU;
damping circuits, each of the damping circuits being separately provided between the output of each of the multiple second Efuse chips and the GPU; and
current paths, each of the current paths being separately provided between the output of the first Efuse chip and each of the GPUs except for the first GPU.

According to one embodiment of the present application, a maximum current of the first Efuse chip is configured to be greater than $I_{MAX}+(n-1)*(I_{MAX}-I_{TDC})$, and $I_{MAX}$ is a maximum current of the GPU, $I_{TDC}$ is a maximum working continuous current of the GPU, and n is a number of the GPUs.

According to one embodiment of the present application, a maximum current of each of the multiple second Efuse chips is configured to be greater than a maximum working continuous current of the GPU and less than a maximum current of the GPU.

BRIEF DESCRIPTION OF THE DRAWINGS

In order to more clearly illustrate the technical solutions in the embodiments of the present application or the related art, the drawings used in the description of the embodiments or the related art will be briefly described below. It is apparent that the drawings in the following description are merely some embodiments of the present application, and other embodiments may be obtained from those of ordinary skill in the art according to these drawings without any creative work.

FIG. 1 is a schematic diagram of a bridge supply circuit of a multipath Efuse chip according to one embodiment of the present application.

DETAILED DESCRIPTION OF THE EMBODIMENTS

In order that the objects, technical solutions and advantages of the present application may be more clearly understood, embodiments of the present application will be described in further detail below with reference to the specific embodiments and the accompanying drawings.

Based on the above object, according to a first aspect of the embodiments of the present application, one embodiment for a bridge supply circuit of a multipath Efuse chip is provided. FIG. 1 shows a schematic diagram of the supply circuit.

As shown in FIG. 1, the power supply circuit may include a first Efuse chip and multiple second Efuse chips, damping circuits, and current paths.

Inputs of the first Efuse chip and the multiple second Efuse chips are connected to a power supply. An output of the first Efuse chip is connected to each of the CPUs. An output of each of the multiple second Efuse chips is separately connected to each of the CPUs except for a first GPU. There are n CPUs in the system, and a heavy-current first Efuse chip supplies power to GPU1 while providing partial currents to other CPUs. (n−1) light-current Efuse chips are designed for a total of (n−1) CPUs from 2-n to supply power respectively. The working current of the light-current Efuse chip is greater than the TDC of each of the CPUs. Taking T4GPU of 75 W (Watt) as an example, the TDC I_TDC=5.5 A (Ampere), the light-current Efuse chip having a specification of about 10 A may be selected.

Each of the damping circuits is separately provided between the output of each of the second Efuse chips and each of the CPUs. The damping circuit may be composed of at least one inductor. A current damping circuit is added between the second to $n^{th}$ light-current Efuse chips and the GPU. The function of the damping circuit is that: when the GPU suddenly increases from the TDC to the Max current, the damping may suppress the increased part of the current from flowing into the second Efuse chip, but power is taken from the first Efuse chip through current path 1.

Each of the current paths is separately provided between the output of the first Efuse chip and each of the CPUs except for the first GPU. The current path may be composed of at least one MOS transistor. The first Efuse chip with heavy current is designs a current path 1 to supply power to the GPU2, designs a current path 2 to supply power to GPU3, and designs (n−1) current paths to supply power to (n−1) CPUs except for GPU1. The current through capability of the current path needs to satisfy the difference between the maximum current of GPU2 and the TDC working current. In actual GPU working, the duration of reaching the maximum current is very short, and it is very rare for the multiple CPUs to reach the maximum current at the same time. As the number of CPUs increases, the probability of reaching the maximum current is lower. The maximum current capability of the first Efuse chip may be appropriately reduced according to the test, and the cost may be reduced.

By means of the technical solution of the present application, the problem of high cost caused due to the fact that multiple heavy-current Efuse chips are needed to be used for supplying power when multiple partial devices of which the instantaneous currents are much larger than the working continuous currents exist in the server may be solved.

In some embodiments of the present application, a maximum current of the first Efuse chip is configured to be greater than $I_{MAX}+(n-1)*(I_{MAX}-I_{TDC})$, and $I_{MAX}$ is a maximum current of the GPU, $I_{TDC}$ is a maximum working continuous current of the GPU, and n is a number of the CPUs.

In some embodiments of the present application, a maximum current of each of the multiple second Efuse chips is configured to be greater than a maximum working continuous current of the GPU and less than a maximum current of the GPU.

In some embodiments of the present application, the damping circuit is composed of at least one inductor, and the current of the inductor is configured to be greater than the maximum working continuous current of the GPU. Design of current damping: a total of n−1 inductors which are including L1, L2, . . . , L(n−1) are placed at the output of each of the second Efuse chips with light current, and the current of the inductors is greater than $I_{TDC}$ in order to suppress the instantaneous heavy current of the GPU and avoid the instantaneous heavy current from taking power from the second Efuse chips with light current.

In some embodiments of the present application, the current path is composed of at least one MOS transistor, a source of the MOS transistor is connected to the output of the first Efuse chip, a drain of the MOS transistor is connected to an output of the damping circuit, and a gate of the MOS transistor is connected to an enable terminal of the second Efuse chip. (n−1) current paths are designed using MOS transistors: Q1, Q2, . . . , Q(n−1), one side of the current path is connected to the output of the heavy-current first Efuse chip, and the other side is connected to the second Efuse chip with light current and the output of the damping circuit.

In some embodiments of the present application, the bridge supply circuit further includes a delay circuit.

The delay circuit is provided between the gate of the MOS transistor and the enable terminal of the second Efuse chip, and the delay circuit is composed of at least one resistor and at least one capacitor. A delay circuit is used for controlling the MOS transistor turn-on of the current path. Since the turn-on time of the MOS transistor is unstable and there may be an instantaneous heavy current when turning on, the delay circuit increasing MOS transistor enable sets the turn-on time of the MOS transistor later than the turn-on time of the second Efuse chip with light current. For example, a control signal of Q1 and a light-current Efuse chip U2 Enable use the same signal Enable_2. R1 and C1 are added to a Gate of Q1 to form a delay circuit. Q1 is turned on later than the turn-on time of U2. The other current paths add the same delay circuit.

In some embodiments of the present application, a maximum working current of the MOS transistor is configured to be greater than a difference between a maximum current of the GPU and a maximum working continuous current of the GPU.

A combination of the heavy-current Efuse chip and the multiple light-current Efuse chips is designed, which may effectively reduce the number of heavy-current Efuse chips used. The current damping circuits and the current paths are designed to ensure that the continuous working current takes power from the light-current Efuse chip and the instantaneous heavy-current takes power from the heavy-current Efuse chip, so as to ensure that the power supply requirements of two working states of the subsequent load are met. The delay circuit is designed to ensure that the turned-on time of the MOS transistor of the circuit path is later than the turned on time of the Efuse chip when it is turned on, so as to ensure the power-on stability of the output voltage and avoid the instantaneous heavy current.

By means of the technical solution of the present application, the problem of high cost caused due to the fact that multiple heavy-current Efuse chips are needed to be used for supplying power when multiple partial devices of which the instantaneous currents are much larger than the working continuous currents exist in the server may be solved.

Based on the above object, according to a second aspect of the embodiments of the present application, a server is also proposed. The server includes a bridge supply circuit of a multipath Efuse chip, the bridge supply circuit of the multipath Efuse chip included:

a first Efuse chip and multiple second Efuse chips, inputs of the first Efuse chip and the multiple second Efuse chips being connected to a power supply, an output of the first Efuse chip being connected to each of Graphics processing units (CPUs), an output of each of the multiple second Efuse chips being separately connected to each of the CPUs except for a first GPU;

damping circuits, each of the damping circuits being separately provided between the output of each of the multiple second Efuse chips and the GPU; and current paths, each of the current paths being separately provided between the output of the first Efuse chip and each of the CPUs except for the first GPU.

In some embodiments of the present application, a maximum current of the first Efuse chip is configured to be greater than $I_{MAX}+(n-1)*(I_{MAX}-I_{TDC})$, and $I_{MAX}$ is a maximum current of the GPU, $I_{TDC}$ is a maximum working continuous current of the GPU, and n is a number of the CPUs.

In some embodiments of the present application, a maximum current of each of the multiple second Efuse chips is configured to be greater than a maximum working continuous current of the GPU and less than a maximum current of the GPU.

While the embodiments of the present application have been shown and described, those of ordinary skill in the art may understand that various modifications, changes, substitutions and variations of the embodiments may be made without departing from the principle and spirit of the present application. The scope of the present application is defined by the appended claims and their equivalents.

The above embodiments are possible examples of implementations, and are presented merely for a clear understanding of the principles of the present application. Many variations and modifications may be made to the above embodiments without departing from the spirit and principles of the technology described herein. All modifications are intended to be included within the scope of the present disclosure and protected by the appended claims.

What is claimed is:

1. A bridge supply circuit of a multipath Electronic fuse (Efuse) chip, comprising:

a first Efuse chip and multiple second Efuse chips, inputs of the first Efuse chip and the multiple second Efuse chips being connected to a power supply, an output of the first Efuse chip being connected to each of Graphics processing units (GPUs), an output of each of the multiple second Efuse chips being separately connected to each of the GPUs except for a first GPU in a one to one correspondence;

damping circuits, each of the damping circuits being separately provided between the output of each of the multiple second Efuse chips and the GPU which is correspondingly connected to one of the multiple second Efuse chips; and current paths, each of the current paths being separately provided between the output of the first Efuse chip and each of the GPUs except for the first GPU.

2. The supply circuit according to claim 1, wherein a maximum current of the first Efuse chip is configured to be greater than IMAX+(n−1)*(IMAX−ITDC), wherein IMAX is a maximum current of each of the GPUs, ITDC is a maximum working continuous current of each of the GPUs, and n is a number of the GPUs.

3. The supply circuit according to claim 1, wherein a maximum current of each of the multiple second Efuse chips is configured to be greater than a maximum working continuous current of each of the GPUs except for the first GPU and less than a maximum current of each of the GPUs except for the first GPU.

4. The supply circuit according to claim 3, wherein the GPU which is correspondingly connected to one of the multiple second Efuse chips is a T4GPU of 75 W, the maximum working continuous current of the GPU which is correspondingly connected to one of the multiple second Efuse chips is 5.5 A, the maximum current of each of the multiple second Efuse chips is 10 A.

5. The supply circuit according to claim 1, wherein each of the damping circuits is composed of at least one inductor, a current of the inductor is configured to be greater than a maximum working continuous current of each of the GPUs except for the first GPU.

6. The supply circuit according to claim 1, wherein each of the current paths is composed of at least one Metal Oxide Semiconductor (MOS) transistor, a source of the MOS transistor is connected to the output of the first Efuse chip, a drain of the MOS transistor is connected to an output of one of the damping circuits, and a gate of the MOS transistor is connected to an enable terminal of one of the multiple second Efuse chips which is correspondingly connected to the one of the damping circuits.

7. The supply circuit according to claim 6, further comprising:

a delay circuit, the delay circuit being provided between the gate of the MOS transistor and the enable terminal of one of the multiple second Efuse chips which is correspondingly connected to the MOS transistor, and the delay circuit being composed of at least one resistor and at least one capacitor.

8. The supply circuit according to claim 7, wherein the delay circuit sets a turn-on time of the MOS transistor later than a turn-on time of one of the multiple second Efuse chips which is correspondingly connected to the MOS transistor.

9. The supply circuit according to claim 6, wherein a maximum working current of the MOS transistor is configured to be greater than a difference between a maximum current of each of the GPUs except for the first GPU and a maximum working continuous current of each of the GPUs except for the first GPU.

10. The supply circuit according to claim 1, wherein a maximum current of the first Efuse chip is greater than a maximum current of each of the multiple second Efuse chips.

11. A server, comprising a bridge supply circuit of a multipath Electronic fuse (Efuse) chip, the bridge supply circuit of the multipath Efuse chip comprising:
- a first Efuse chip and multiple second Efuse chips, inputs of the first Efuse chip and the multiple second Efuse chips being connected to a power supply, an output of the first Efuse chip being connected to each of Graphics processing units (GPUs), an output of each of the multiple second Efuse chips being separately connected to each of the GPUs except for a first GPU in a one-to-one correspondence;
- damping circuits, each of the damping circuits being separately provided between the output of each of the multiple second Efuse chips and the GPU which is correspondingly connected to one of the multiple second Efuse chips; and
- current paths, each of the current paths being separately provided between the output of the first Efuse chip and each of the GPUs except for the first GPU.

12. The server according to claim 11, wherein a maximum current of the first Efuse chip is configured to be greater than IMAX+(n−1)*(IMAX-ITDC), wherein IMAX is a maximum current of each of the GPUs, ITDC is a maximum working continuous current of the GPU, and n is a number of the GPUs.

13. The server according to claim 11, wherein a maximum current of each of the multiple second Efuse chips is configured to be greater than a maximum working continuous current of each of the GPUs except for the first GPU and less than a maximum current of each of the GPUs except for the first GPU.

14. The server according to claim 13, wherein the GPU is which is correspondingly connected to one of the multiple second Efuse chips is a T4GPU of 75 W, the maximum working continuous current of the GPU which is correspondingly connected to one of the multiple second Efuse chips is 5.5 A, the maximum current of each of the multiple second Efuse chips is 10 A.

15. The server according to claim 11, wherein each of the damping circuits is composed of at least one inductor, a current of the inductor is configured to be greater than a maximum working continuous current of each of the GPUs except for the first GPU.

16. The server according to claim 11, wherein each of the current paths is composed of at least one Metal Oxide Semiconductor (MOS) transistor, a source of the MOS transistor is connected to the output of the first Efuse chip, a drain of the MOS transistor is connected to an output of one of the damping circuits, and a gate of the MOS transistor is connected to an enable terminal of one of the multiple second Efuse chips which is correspondingly connected to the one of the damping circuits.

17. The server according to claim 16, the bridge supply circuit of the multipath Efuse chip further comprising:
- a delay circuit, the delay circuit being provided between the gate of the MOS transistor and the enable terminal of one of the multiple second Efuse chips which is correspondingly connected to the MOS transistor, and the delay circuit being composed of at least one resistor and at least one capacitor.

18. The server according to claim 17, wherein the delay circuit sets a turn-on time of the MOS transistor later than a turn-on time of the one of the multiple second Efuse chips which is correspondingly connected to the MOS transistor.

19. The server according to claim 16, wherein a maximum working current of the MOS transistor is configured to be greater than a difference between a maximum current of each of the GPUs except for the first GPU and a maximum working continuous current of each of the GPUs except for the first GPU.

20. The server according to claim 11, wherein a maximum current of the first Efuse chip is greater than a maximum current of each of the multiple second Efuse chips.

* * * * *